United States Patent [19]
Fehnel

[11] Patent Number: 5,590,092
[45] Date of Patent: Dec. 31, 1996

[54] SYSTEMS AND METHODS FOR GENERATING A CURRENT TIME OF DAY IN A CELLULAR RADIOTELEPHONE

[75] Inventor: Michael D. Fehnel, Fuquay-Varina, N.C.

[73] Assignee: Ericsson Inc., Research Triangle Park, N.C.

[21] Appl. No.: 369,164

[22] Filed: Jan. 5, 1995

[51] Int. Cl.$^6$ .......................... G04B 47/00; G04C 11/02; H01Q 7/04
[52] U.S. Cl. ................... 368/10; 368/47; 379/59; 455/33.1; 455/54.1
[58] Field of Search .................. 368/10, 21, 22, 368/46, 47; 379/59, 60, 63; 455/33, 34, 54, 56, 58

[56] References Cited

U.S. PATENT DOCUMENTS

| | | | |
|---|---|---|---|
| 4,775,999 | 10/1988 | Williams | 379/59 |
| 5,258,964 | 11/1993 | Koma et al. | 368/47 |
| 5,363,377 | 11/1994 | Sharpe | 370/100.1 |
| 5,375,104 | 12/1994 | Ishii et al. | 368/22 |
| 5,455,807 | 10/1995 | Nepple et al. | 368/47 |
| 5,469,411 | 11/1995 | Owen | 368/47 |

FOREIGN PATENT DOCUMENTS

| | | |
|---|---|---|
| 0461849A2 | 12/1991 | European Pat. Off. . |
| 3531831 | 3/1987 | Germany . |
| 2245399 | 1/1992 | United Kingdom . |
| WO94/08432 | 4/1994 | WIPO . |

Primary Examiner—Vit W. Miska
Attorney, Agent, or Firm—Bell, Seltzer, Park & Gibson

[57] ABSTRACT

A current time of day is generated in a cellular radiotelephone by monitoring changes in the registration ID (REGID) field of the overhead messages as the REGID is incremented. The cellular radiotelephone user is prompted to indicate a time of day, and a corresponding REGID value is obtained. The time interval between REGID updates is determined. When a current time of day is required, a current REGID value is obtained and a current time of day is calculated based on the user indicated time of day, the difference between the REGID values and the update interval. Current time of day may thereby be generated in cellular radiotelephone systems which do not broadcast a current time of day, without the need for real time clock chips in the cellular radiotelephone.

39 Claims, 2 Drawing Sheets

SYSTEMS AND METHODS FOR GENERATING A CURRENT TIME OF DAY IN A CELLULAR RADIOTELEPHONE

FIELD OF THE INVENTION

This invention relates to cellular radiotelephone systems and methods.

BACKGROUND OF THE INVENTION

Cellular radiotelephone systems are increasingly being used for wireless mobile communications. As known to those having skill in the art, a cellular radiotelephone system is a wide area communications network which utilizes a frequency reuse pattern in a plurality of cells. The design and operation of an analog cellular phone system are described in an article entitled "*Advanced Mobile Phone Service*" by Blecher, IEEE Transactions on Vehicular Technology, Vol. VT 29, No. 2, May 1980, pp. 238–244. The analog mobile cellular system is also referred to as the "AMPS" system.

Recently, digital cellular radiotelephone systems have also been proposed and implemented using a Time-Division Multiple Access (TDMA) architecture. Standards have also been set by the Electronics Industries Association (EIA) and the Telecommunications Industries Association (TIA) for an American Digital Cellular (ADC) architecture which is a dual mode analog and digital system following EIA/TIA standard IS-54B. Telephones which implement the IS-54B dual mode architecture are presently being marketed by the assignee of the present invention. Different standards have been promulgated for digital cellular radiotelephone systems in Europe. The European digital cellular system, referred to as GSM, also uses a TDMA architecture.

A cellular radiotelephone network includes a plurality of spaced-apart small radio zones called cells. Each cell includes a base station for transmitting and receiving messages to and from cellular radiotelephones which are located within the cell range. A plurality of base stations are connected to a Mobile Telephone Switching Office (MTSO) which acts as a controller for the cellular system. The MTSO is also connected to the Public Switched Telephone Network (PSTN) to allow communications between cellular radiotelephones and wire line phones.

As used herein, the term "cellular radiotelephone" encompasses a wide variety of portable radiotelephone devices which access a cellular radiotelephone system. Cellular radiotelephones include portable telephones of the hand-held or bag phone variety and permanently mounted car cellular telephones. The term "cellular radiotelephone" also includes terminals which provide functions in addition to those of a cellular telephone, such as facsimile, data communications, data processing, word processing applications and other personal communications systems functions. These high function cellular radiotelephones are often referred to as "Personal Communications Systems" (PCS).

It is often desirable for the current time of day to be available at the cellular radiotelephone. For example, it is often desirable for the cellular radiotelephone to display a current time of day, either continuously or in response to a user request. In another example, a cellular radiotelephone may store an incoming message when the cellular radiotelephone is unattended. In this situation, it is desirable to timestamp the incoming message with a current time of day. Other functions at the cellular radiotelephone may also make use of the current time of day.

In order to provide a current time of day at a cellular radiotelephone, some digital cellular radiotelephone systems broadcast a current time of day as part of their overhead messaging. However, the analog (AMPS) system and the dual mode analog and digital system do not typically broadcast a current time of day as part of overhead messaging. Accordingly, in order to implement a current time of day, cellular radiotelephones which operate under an analog or dual mode standard have included a real time clock chip. Unfortunately, real time clock chips may add to the cost of the cellular radiotelephone, may increase the power consumption thereof and may make miniaturization of the cellular radiotelephone more difficult. Accordingly, there is need for systems and methods which generate a current time of day in a cellular radiotelephone without the need for a real time clock chip.

SUMMARY OF THE INVENTION

It is therefore an object of the invention to provide methods and systems for generating a current time of day in a cellular radiotelephone.

It is another object of the present invention to provide methods and systems for generating a current time of day in cellular radiotelephone systems which do not broadcast a current time of day as part of overhead messages.

It is yet another object of the present invention to provide a current time of day in a cellular radiotelephone without the need for a real time clock chip.

These and other objects are provided according to the present invention by using the Registration ID (REGID) field in the overhead messages which are broadcast by the cellular radiotelephone system, to determine a current time of day. As is well known to those having skill in the art, the REGID field is a 20-bit field in an AMPS system and which is incremented one bit on a periodic basis, such as every five seconds. By determining the update interval for the REGID field, the cellular radiotelephone can calculate a current time of day based upon the REGID value of a contemporaneously received overhead message.

In particular, according to the invention, the cellular radiotelephone accepts a user indication of a time of day, for example by user input at the cellular radiotelephone keypad in response to a prompt to enter the current time. Contemporaneous with the acceptance of the user indication of time of day, the cellular radiotelephone overhead messages are monitored to obtain a contemporaneous value of REGID. A timer is set and the time interval between REGID updates in the cellular radiotelephone overhead messages is determined. When the cellular radiotelephone needs to generate a current time of day, a current value of REGID is obtained and the difference between the current value and the contemporaneous value is obtained. The difference is multiplied by the time interval and the result is added to the accepted user indication of the time of day to obtain a current time of day. The current time of day may be used to provide a timestamp for an incoming message, for display, or for other cellular radiotelephone activities.

Accordingly, the update interval of the REGID field, the value of REGID at the time the user inputs a time of day, and the current value of REGID are used to calculate a current time of day. It will be understood by those having skill in the art that the value obtained for current time of day will be an approximate value, because the user indication of the time of day may be inaccurate and the value of REGID may be updated at slightly fluctuating intervals. However, the current time of day which is obtained will typically be more than sufficient for the activity required at the cellular radiotelephone, without the need for real time clock chips.

DETAILED DESCRIPTION OF PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
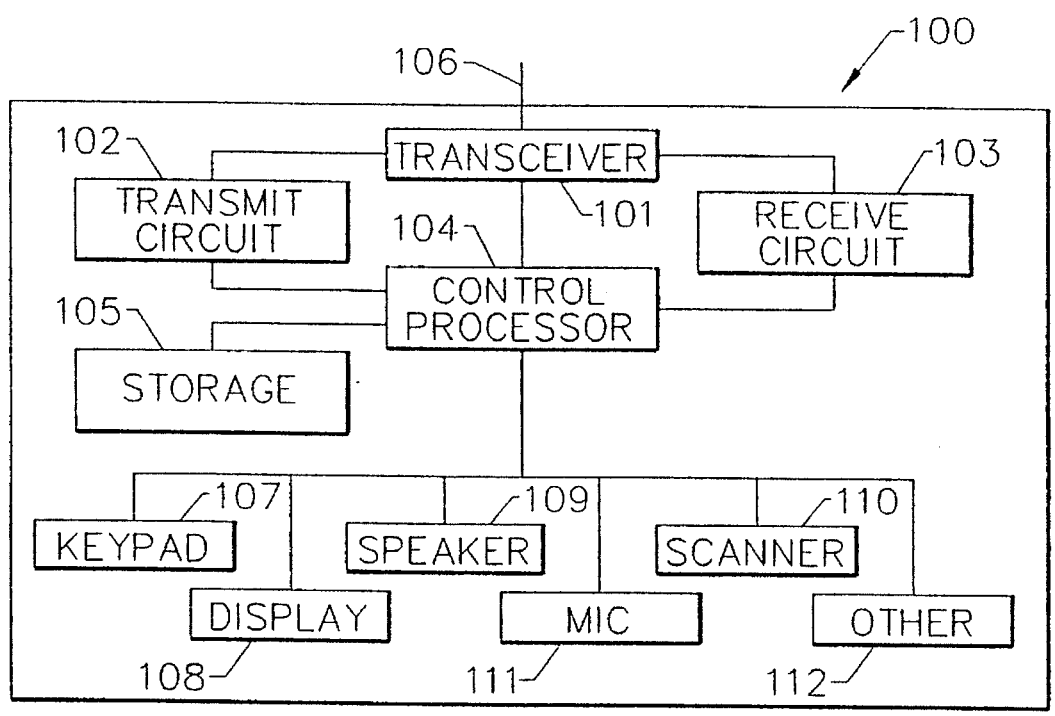
FIG. 1 is an electrical block diagram of a cellular radiotelephone.

Referring now to FIG. 1, an electrical block diagram of a cellular radiotelephone which generates current time of day according to the present invention will now be described. As shown, cellular radiotelephone 100 includes a transceiver 101 or other means for communicating with the cellular radiotelephone system. Transceiver 101 is connected to antenna 106. Cellular radiotelephone 100 further includes a control processor 104. Storage means 105 is electrically connected to control processor 104 to provide a storage capacity for program and data information. Storage means 105 may include conventional readable and writable memory such as RAM, nonvolatile memory such as EEPROM as well as read only memory (ROM).

Transceiver 101 may be selected to generate and receive signals conforming to any standard including but not limited to AMPS, ETACS, NMT450, NMT900, GSM, DCS1800, IS-54B or IS-3-D. However, the present invention is preferably used with systems which do not broadcast a current time of day as part of their overhead messaging. Transmit circuit 101 and receive circuit 103 perform transmit and receive signal processing respectively.

As further shown in FIG. 1, cellular radiotelephone 100 also typically includes a keypad 107, a display 108, a speaker 109 and a microphone 111. In order to provide a computer communications terminal for receipt and transmission of audio, video and data and/or multimedia signals, keypad 107 may be a full scale personal computer keyboard and display 108 may be a large graphics display. A scanner 110 may be also be provided, as may other devices 112 such as disk drives and modems to provide a Personal Communication System (PCS) terminal. The design of cellular radiotelephone 100 is well known to those having skill in the art, and need not be described further herein.

According to the invention, cellular radiotelephone 100 also includes a system and method for generating a current time of day. The current time of day determining system and method is preferably embodied in a stored program in storage means 105 which is executed by control processor 104 to control the components of cellular radiotelephone 100. However, it will also be understood by those having skill in the art that dedicated hardware such as adders, multipliers, logic gates and the like, may also be provided for generating a current time of day.

Figure 2:
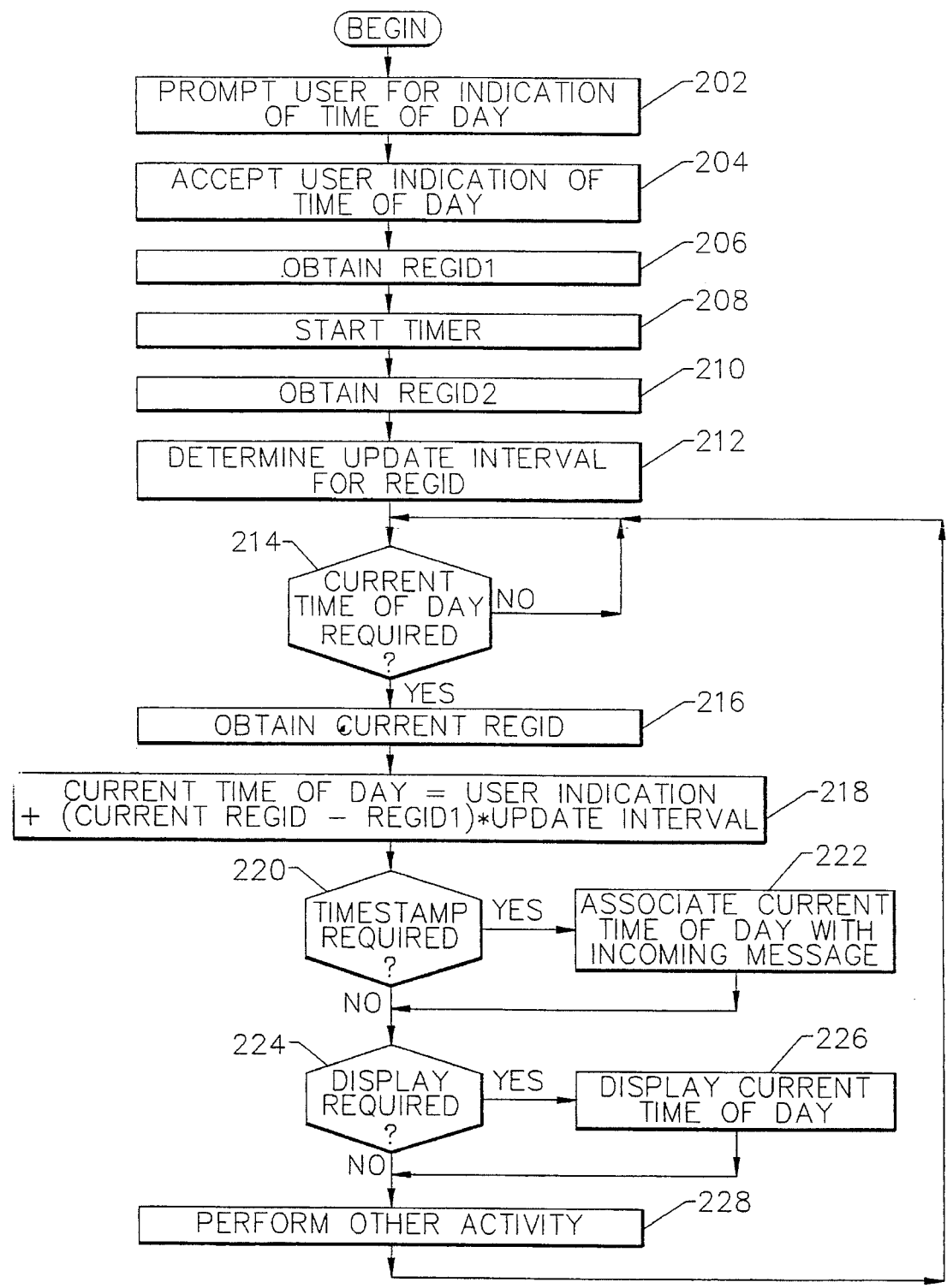
FIG. 2 is a flowchart illustrating operations for generating a current time of day in the cellular radiotelephone of FIG. 1 according to the present invention.

Referring now to FIG. 2, operations for generating a current time of day in cellular radiotelephone 100 will now be described. At Block 202, a user indication of the time of day is obtained, for example by prompting the user for an indication of the time of day. In particular, control processor 104 may display a prompt on display 108 for the user to "ENTER THE CURRENT TIME". It will also be understood that a verbal message may be issued via speaker 109, instead of or in addition to the displayed prompt. The prompt may be generated upon initial application of power to the cellular radiotelephone. The prompt may also be generated when a new user input is required for time synchronization. For example, when the cellular radiotelephone moves from one cellular system to another, the value of REGID will typically change. In order to resynchronize the system, the user may again be prompted to enter a current time of day. The prompt may also be reissued on a periodic basis to ensure that synchronization is present, or as otherwise required.

In response to the prompt, a user indication of the time of day is accepted at Block 204. The user indication may be provided by entering a current time of day on keypad 107, by speaking a time of day into microphone 111 or by other known means. It will be understood by those having skill in the art that user entry of time of day will typically be in form of hours and minutes because a precise time of day to the nearest second may not be known and is typically not required. The user indication of time of day is stored in nonvolatile memory.

At Block 206, the cellular radiotelephone obtains a value of REGID, referred to herein as REGID1. REGID1 is obtained contemporaneously with acceptance of the user indication of time of day. By contemporaneously, it is meant that the value of REGID1 is obtained within a few minutes, and preferably within about one minute, of the user indication of the time of day at Block 204, so that the value of REGID1 is accurately correlated with the user indication of time of day. Since the time of day will typically be calculated to the nearest minute, and REGID is typically incremented every five seconds, it is not necessary to obtain the very next available REGID message from the time the user indication is accepted. The value of REGID1 is stored in nonvolatile memory.

It will be understood by those having skill in the art that REGID is typically a part of a Registration ID overhead message. See, for example, EIA Interim Standard IS-3-D, dated March 1987 at Paragraph 3.7.1.2.3, the disclosure of which is incorporated herein by reference. A similar definition may be found in EIA/TIA Standard IS-54B. As described therein, the Registration ID message specifies the frequency with which the cellular radiotelephone must register with the cellular system, and consists of one word. When sent, the message must be appended to a system parameter overhead message in addition to any global action messages. The format of REGID is:

| $T_1T_2$ = 11 | DCC | REGID | END | OHD = 000 | P |
|---|---|---|---|---|---|
| 2 | 2 | 20 | 1 | 3 | 12 |

The interpretation of the data fields is as follows:

$T_1T_2$—Type field. Set to '11' indicating overhead word.

DCC—Digital color code field.

OHD—Overhead message type field. Set to '000 ' indicating the Registration ID message.

REGID—Registration ID field.

END—End indication field. Set to '1' to indicate last word of the overhead message train. Set to '0' if not last word.

P—Parity field.

Other cellular radiotelephone systems include the REGID field or another field which is incremented or decremented periodically and which may be used for generating a current time of day according to the invention.

At Block 208, when REGID1 is obtained, a timer is started at Block 208 using the timer function of control processor 104. A second value of REGID, referred to herein as REGID2, is obtained at Block 210. At Block 212, an update interval for REGID is obtained, and stored in nonvolatile storage. In its simplest form, the REGID field is monitored by the cellular radiotelephone until the value of REGID increments by one. The value of the timer is then recorded so that the difference, in seconds, between updates of REGID is obtained. This value is typically about five seconds. In order to preserve accuracy, this value may be recorded to the nearest hundredth of a second.

It will also be understood, by those having skill in the art that any two values of REGID may be obtained, and the real time difference between the two values may be calculated and then divided by the difference value between the two REGID values, to obtain the value of the periodic update interval for REGID. Thus, the values of REGID need not be consecutive values of REGID and neither value of REGID need correspond to the value of REGID which was obtained contemporaneously with the user indication of time of day (REGID1).

Referring again to FIG. 2, at Block 214 a determination is made that a current time of day is required. A current time of day may be required for purposes of displaying a current time of day on a periodic basis or in response to a user request, to timestamp an incoming message or for other activities. When a current time of day is required, the current value of REGID is obtained at Block 216. Again, since the time of day computation is only approximate, the immediately following value of REGID need not be obtained, but rather a REGID which is contemporaneous with the requirement for the current time of day at Block 214.

At Block 218, the current time of day is obtained by multiplying the difference between the current REGID and the REGID which was obtained contemporaneous with the user indication of the time of day, by the update interval, and adding the result to the accepted user indication of the time of day. In other words:

Current time of day=user indication+(current REGID−REGID1) * update interval

It will be recalled that the user indication, REGID1 and update intervals were previously stored in nonvolatile memory. Thus, intervening power down of the cellular radiotelephone will not prevent generation of current time of day upon reapplication of power.

At Block 220, if a timestamp is required, then the current time of day is associated with an incoming message at Block 222. If a display is required at Block 224, then the current time of day is displayed at Block 226. If other activity is required using the current time of day, the other activity is performed at Block 228. Accordingly, the present invention uses the value of REGID or any other continuously incrementing or decrementing field in a cellular radiotelephone system overhead message, to generate an approximation of a current time of day without the need for real time clock chips. While only an approximation, the generated current time of day may be used for many functions in the cellular radiotelephone.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A method of generating a current time of day in a cellular radiotelephone which accepts cellular radiotelephone messages including overhead messages containing a Registration ID (REGID) field, said current time of day generating method comprising the steps of:

accepting a user indication of a time of day;

contemporaneous with said accepting step, monitoring the cellular telephone overhead messages to obtain a contemporaneous value of REGID;

determining a time interval between REGID updates in the cellular telephone overhead messages;

obtaining a difference between a current value of REGID and the contemporaneous value of REGID;

multiplying the difference by the time interval to obtain a result; and adding the result and the accepted user indication of the time of day to obtain a current time of day.

2. A method according to claim 1 further comprising the step of:

displaying the current time of day.

3. A method according to claim 1 further comprising the step of:

associating the current time of day with an incoming cellular radiotelephone message.

4. A method according to claim 1 wherein said accepting step is preceded by the step of:

prompting for a user indication of time of day.

5. A method according to claim 1 wherein said determining step comprises the steps of:

monitoring the cellular telephone overhead messages to obtain a first value of REGID;

starting a timer;

monitoring the cellular radiotelephone overhead message to obtain a second value of REGID;

obtaining from the timer a time interval from the first value of REGID to the second value of REGID; and dividing the time interval by the difference between the first value of REGID and the second value of REGID to determine the time interval between REGID updates.

6. A method according to claim 1 further comprising the step of:

periodically transmitting the overhead messages containing a REGID field.

7. A method of generating a current time of day in a cellular radiotelephone which accepts cellular radiotelephone messages including overhead messages containing a Registration ID (REGID) field, said current time of day generating method comprising the steps of:

accepting a user indication of a time of day;

determining a time interval between REGID updates in the cellular telephone overhead messages;

determining a current REGID; and combining the user indication of a time of day, the time interval between REGID updates, and the current REGID to obtain a current time of day.

8. A method according to claim 7 further comprising the step of:

displaying the current time of day.

9. A method according to claim 7 further comprising the step of:

associating the current time of day with an incoming cellular radiotelephone message.

10. A method according to claim 7 wherein said accepting step is preceded by the step of:

prompting for a user indication of time of day.

11. A method according to claim 7 further comprising the step of:

periodically transmitting the overhead messages containing a REGID field.

12. A method of generating a current time of day in a cellular radiotelephone which accepts cellular radiotelephone messages including overhead messages containing a field which is periodically incremented or decremented, said current time of day generating method comprising the steps of:

prompting for a user indication of a time of day;

accepting a user indication of a time of day;

monitoring incrementation or decrementation of the field in the overhead message; and combining the user indication of a time of day and the monitored incrementation or decrementation of the field to obtain a current time of day.

13. A method according to claim 12 wherein the field is the Registration ID (REGID) field of the overhead messages.

14. A method according to claim 12 further comprising the step of:

displaying the current time of day.

15. A method according to claim 12 further comprising the step of:

associating the current time of day with an incoming cellular radiotelephone message.

16. A method according to claim 12 further comprising the step of:

periodically transmitting the overhead messages containing a field which is periodically incremented or decremented.

17. A method of generating a current time of day in a cellular radiotelephone which accepts cellular radiotelephone messages including overhead messages containing a Registration ID (REGID) field, said current time of day generating method comprising the step of:

determining a current time of day based upon a user input of a time of day and the REGID value of a contemporaneously received overhead message.

18. A method according to claim 17 further comprising the step of:

displaying the current time of day.

19. A method according to claim 17 further comprising the step of:

associating the current time of day with an incoming cellular radiotelephone message.

20. A method according to claim 17 further comprising the step of:

periodically transmitting the overhead messages containing a REGID field.

21. A cellular radiotelephone comprising:

means for receiving cellular radiotelephone messages including overhead messages containing a Registration ID (REGID) field;

means for accepting a user indication of a time of day;

means, responsive to said accepting means and to said receiving means, for monitoring the received cellular telephone overhead messages to obtain a contemporaneous value of REGID;

means for determining a time interval between REGID updates in the cellular telephone overhead messages;

means, responsive to a request to obtain a current time of day, for obtaining a difference between a current value of REGID and the contemporaneous value of REGID;

means, responsive to said obtaining means, for multiplying the difference by the time interval to obtain a result; and means, responsive to said multiplying means, for adding the result and the accepted user indication of the time of day to obtain a current time of day.

22. A cellular radiotelephone according to claim 21 further comprising:

means for displaying the current time of day.

23. A cellular radiotelephone according to claim 21 further comprising:

means for associating the current time of day with an incoming cellular radiotelephone message.

24. A cellular radiotelephone according to claim 21 further comprising:

means for prompting for a user indication of time of day.

25. A cellular radiotelephone according to claim 21 in combination with a cellular radiotelephone system for periodically transmitting the overhead messages containing a REGID field to said cellular radiotelephone.

26. A cellular radiotelephone comprising:

means for receiving cellular radiotelephone messages including overhead messages containing a Registration ID (REGID) field;

means for accepting a user indication of a time of day;

means, responsive to said accepting means and to said receiving means, for determining a time interval between REGID updates in the cellular telephone overhead messages;

means, responsive to a request to obtain a current time of day, for combining the user indication of a time of day, the time interval between REGID updates, and a current REGID to obtain a current time of day.

27. A cellular radiotelephone according to claim 26 further comprising:

means for displaying the current time of day.

28. A cellular radiotelephone according to claim 26 further comprising:

means for associating the current time of day with an incoming cellular radiotelephone message.

29. A cellular radiotelephone according to claim 26 further comprising:

means for prompting for a user indication of time of day.

30. A cellular radiotelephone according to claim 26 in combination with a cellular radiotelephone system for periodically transmitting the overhead messages containing a REGID field to said cellular radiotelephone.

31. A cellular radiotelephone comprising;

means for receiving cellular radiotelephone messages including overhead messages containing a field which is periodically incremented or decremented;

means for prompting for a user indication of time of day;.

means for accepting a user indication of a time of day;

means for monitoring incrementation or decrementation of the field in the overhead message; and means, responsive to a request to obtain a current time of day, for combining the user indication of a time of day and the monitored incrementation or decrementation of the field to obtain a current time of day.

32. A cellular radiotelephone according to claim 31 wherein the field is the Registration ID (REGID) field of the overhead messages.

33. A cellular radiotelephone according to claim 31 further comprising:

means for displaying the current time of day.

34. A cellular radiotelephone according to claim 31 further comprising:

means for associating the current time of day with an incoming cellular radiotelephone message.

35. A cellular radiotelephone according to claim 31 in combination with a cellular radiotelephone system for periodically transmitting the overhead messages containing a field which is periodically incremented or decremented, to said cellular radiotelephone.

36. A cellular radiotelephone comprising:

means for receiving cellular radiotelephone messages including overhead messages containing a Registration ID (REGID) field; and means, responsive to said receiving means and to a user input of a time of day, for determining a current time of day based upon the REGID value of a contemporaneously received overhead message.

37. A cellular radiotelephone according to claim 36 further comprising:

means for displaying the current time of day.

38. A cellular radiotelephone according to claim 36 further comprising:

means for associating the current time of day with an incoming cellular radiotelephone message.

39. A cellular radiotelephone according to claim 36 in combination with a cellular radiotelephone system for periodically transmitting the overhead messages containing a REGID field to said cellular radiotelephone.

* * * * *